US008375066B2

(12) United States Patent
Simon

(10) Patent No.: US 8,375,066 B2
(45) Date of Patent: Feb. 12, 2013

(54) GENERATING UNIQUE IDENTIFIERS

(75) Inventor: Nisanth M. Simon, Bangalore (IN)

(73) Assignee: International Business Machines Corporation, Armonk, NY (US)

(*) Notice: Subject to any disclaimer, the term of this patent is extended or adjusted under 35 U.S.C. 154(b) by 214 days.

(21) Appl. No.: 12/767,146

(22) Filed: Apr. 26, 2010

(65) Prior Publication Data

US 2011/0264706 A1 Oct. 27, 2011

(51) Int. Cl.
 *G06F 17/30* (2006.01)
(52) U.S. Cl. .................. 707/803; 708/250; 713/184
(58) Field of Classification Search ............ 707/803, 707/999.102; 708/250; 713/184
See application file for complete search history.

(56) References Cited

U.S. PATENT DOCUMENTS

| | | | | |
|---|---|---|---|---|
| 5,522,077 | A * | 5/1996 | Cuthbert et al. ................. | 1/1 |
| 5,815,709 | A * | 9/1998 | Waldo et al. ................. | 712/300 |
| 6,442,276 | B1 * | 8/2002 | Doljack ........................ | 380/51 |
| 6,647,402 | B1 * | 11/2003 | Chiu .......................... | 708/250 |
| 6,711,563 | B1 * | 3/2004 | Koskas ........................ | 707/769 |
| 6,781,998 | B1 * | 8/2004 | Karlsson ...................... | 370/395.71 |
| 6,973,665 | B2 | 12/2005 | Dudkiewicz | |
| 7,010,542 | B2 | 3/2006 | Trappen | |
| 7,051,071 | B2 | 5/2006 | Stewart | |
| 7,051,365 | B1 | 5/2006 | Bellovin | |
| 7,072,800 | B1 | 7/2006 | Fernandez | |
| 7,096,216 | B2 | 8/2006 | Anonsen | |
| 7,130,856 | B2 | 10/2006 | Anonsen | |
| 7,136,873 | B2 | 11/2006 | Smith | |
| 7,149,733 | B2 | 12/2006 | Lin | |
| 7,249,181 | B2 * | 7/2007 | Helliwell ..................... | 709/226 |
| 7,328,228 | B2 * | 2/2008 | Klein et al. .................. | 708/250 |
| 7,359,912 | B2 | 4/2008 | Trappen | |
| 7,376,668 | B2 | 5/2008 | Smith | |
| RE40,389 | E | 6/2008 | Chiu | |
| 7,418,475 | B2 | 8/2008 | Stewart | |
| 7,421,735 | B2 | 9/2008 | Kerstens | |
| 7,434,247 | B2 | 10/2008 | Dudkiewicz | |
| 7,454,785 | B2 | 11/2008 | Kerstens | |
| 7,478,087 | B2 | 1/2009 | Lin | |
| 7,502,861 | B1 | 3/2009 | Protassov | |
| 7,512,645 | B2 * | 3/2009 | Pitz et al. ..................... | 708/250 |
| 7,555,447 | B2 | 6/2009 | Chinnappan et al. | |
| 7,571,142 | B1 * | 8/2009 | Flitcroft et al. ................ | 705/44 |
| 7,606,831 | B2 | 10/2009 | Quinn et al. | |
| 7,630,986 | B1 | 12/2009 | Herz | |

(Continued)

FOREIGN PATENT DOCUMENTS

EP 1005237 B1 5/2000

OTHER PUBLICATIONS

PCT/EP2011/056427 International Search Report and Written Opinion for the International Searching Authority, Jul. 7, 2011 (9 Pages).

(Continued)

*Primary Examiner* — Phuong Thao Cao

(74) *Attorney, Agent, or Firm* — Anthony V. S. England; Ingrid M. Foerster

(57) ABSTRACT

A method, a system, and a computer program product for creating a set of identifiers are disclosed. A first set of identifiers is generated by a first randomization of a partition. Identifiers of the first set of identifiers are selected to generate a third set of identifiers. A second set of identifiers comprising a pre-defined number of identifiers is generated by a second randomization of the third set of identifiers.

14 Claims, 4 Drawing Sheets

U.S. PATENT DOCUMENTS

| | | | |
|---|---|---|---|
| 7,716,180 B2 | 5/2010 | Vermeulen | |
| 7,735,077 B2 | 6/2010 | Laird | |
| 7,766,740 B2 * | 8/2010 | Penrice | 463/18 |
| 7,904,494 B2 * | 3/2011 | Cho et al. | 708/251 |
| 7,941,552 B1 | 5/2011 | Protassov | |
| 7,979,569 B2 | 7/2011 | Eisner | |
| 7,984,495 B1 * | 7/2011 | Aravind | 726/15 |
| 7,991,855 B2 | 8/2011 | Kubsch | |
| 8,068,010 B2 | 11/2011 | Bauchot | |
| 8,069,140 B2 | 11/2011 | Enenkiel | |
| 8,136,025 B1 * | 3/2012 | Zhu et al. | 715/200 |
| 2002/0010741 A1 | 1/2002 | Stewart | |
| 2004/0158506 A1 | 8/2004 | Wille | |
| 2006/0155770 A1 * | 7/2006 | Asher et al. | 707/104.1 |
| 2006/0193317 A1 * | 8/2006 | Rajagopalan et al. | 370/389 |
| 2007/0018002 A1 | 1/2007 | Lapstun et al. | |
| 2007/0106673 A1 * | 5/2007 | Enenkiel | 707/10 |
| 2007/0143853 A1 * | 6/2007 | Tsukamoto | 726/26 |
| 2007/0156842 A1 | 7/2007 | Vermeulen | |
| 2007/0276928 A1 | 11/2007 | Rhoads | |
| 2008/0021837 A1 | 1/2008 | Chang et al. | |
| 2008/0033835 A1 | 2/2008 | Philyaw | |
| 2008/0046263 A1 | 2/2008 | Sager et al. | |
| 2008/0126318 A1 | 5/2008 | Frankovitz | |
| 2008/0288561 A1 * | 11/2008 | Croisettier et al. | 707/205 |
| 2008/0307197 A1 | 12/2008 | Calvin et al. | |
| 2009/0024655 A1 * | 1/2009 | Stuhec et al. | 707/103 R |
| 2009/0036188 A1 * | 2/2009 | Gelman | 463/16 |
| 2009/0222285 A1 | 9/2009 | Silverbrook et al. | |
| 2009/0230190 A1 | 9/2009 | Chanez et al. | |
| 2009/0234756 A1 | 9/2009 | Omatsu | |
| 2009/0274293 A1 * | 11/2009 | Barnett et al. | 379/266.01 |
| 2010/0030800 A1 * | 2/2010 | Brodfuehrer et al. | 707/102 |
| 2010/0094878 A1 | 4/2010 | Soroca | |
| 2010/0235372 A1 * | 9/2010 | Camble et al. | 707/758 |
| 2011/0009179 A1 * | 1/2011 | Tomei | 463/19 |
| 2011/0087786 A1 | 4/2011 | Chandrachood | |
| 2011/0095872 A1 | 4/2011 | Bhadriraju | |
| 2011/0138036 A1 | 6/2011 | Tyree | |

OTHER PUBLICATIONS

"Serial Number Management (LO-MD-SN)", Release 4.6C, Apr. 2001, copyright 2000 SAP AG.

* cited by examiner

GENERATING UNIQUE IDENTIFIERS

BACKGROUND

1. Field

The subject matter disclosed herein relates to identifiers and more particularly relates to generating unique identifiers.

2. Description of the Related Art

Typically, unique identifiers are used in a variety of arrangements to help identify particular objects. A number of suppliers, such as, for example, wholesale retailers, use bar codes to track inventory, identify a usage of entities, and in devising marketing strategies and business analytics. In order to track each individual unit of a good, the individual unit needs to be uniquely identified. The identification is preferably within a same class of products, using some appropriate methodology. In the retail industry, as an example, there are various encoding schemes and standards to encode various objects with identifiers on bar codes, Radio Frequency Identifiers (RFID), and the like.

Unfortunately, counterfeiters try to identify patterns in the generation of unique identifiers in order to create counterfeit identifiers. It is therefore difficult to generate large numbers of unique identifiers quickly that are not easily anticipated.

BRIEF SUMMARY

Embodiments of the invention are directed to a method, a system and a computer program product for creating a set of identifiers. Accordingly, embodiments generate a first set of identifiers by a first randomization of a partition. Embodiments further select a third set of identifiers from the first set of identifiers, and generate a second set of identifiers comprising a pre-defined number of identifiers by a second randomization of the third set of identifiers.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention be readily understood, a more particular description of the embodiments briefly described above will be rendered by reference to specific embodiments that are illustrated in the appended drawings. Understanding that these drawings depict only some embodiments and are not, therefore, to be considered limiting of scope, the embodiments will be described and explained with additional specificity and detail through the use of the accompanying drawings, in which.

DETAILED DESCRIPTION

In a high volume production of objects, generating sufficiently randomized identifier sets may necessitate using large identifier spaces making it difficult to assure each identifier's uniqueness. Efficiency is improved with optimal use the available identifier space. For various reasons, including for example, legal auditing or reporting, it may also be desirable to create enumerable identifiers for objects. In typical mass production scenarios where the number of items produced per unit time is relatively high, a large number of identifiers are requested before starting the production of each batch. In such cases the response time to generate, record and allocate identifiers should be minimized. There is also a possibility that multiple manufacturing lines may request identifiers for the same product almost concurrently. Another feature of creating identifiers may pertain to some identifiers being blocked or blacklisted from usage for a variety of reasons.

Figure 1:
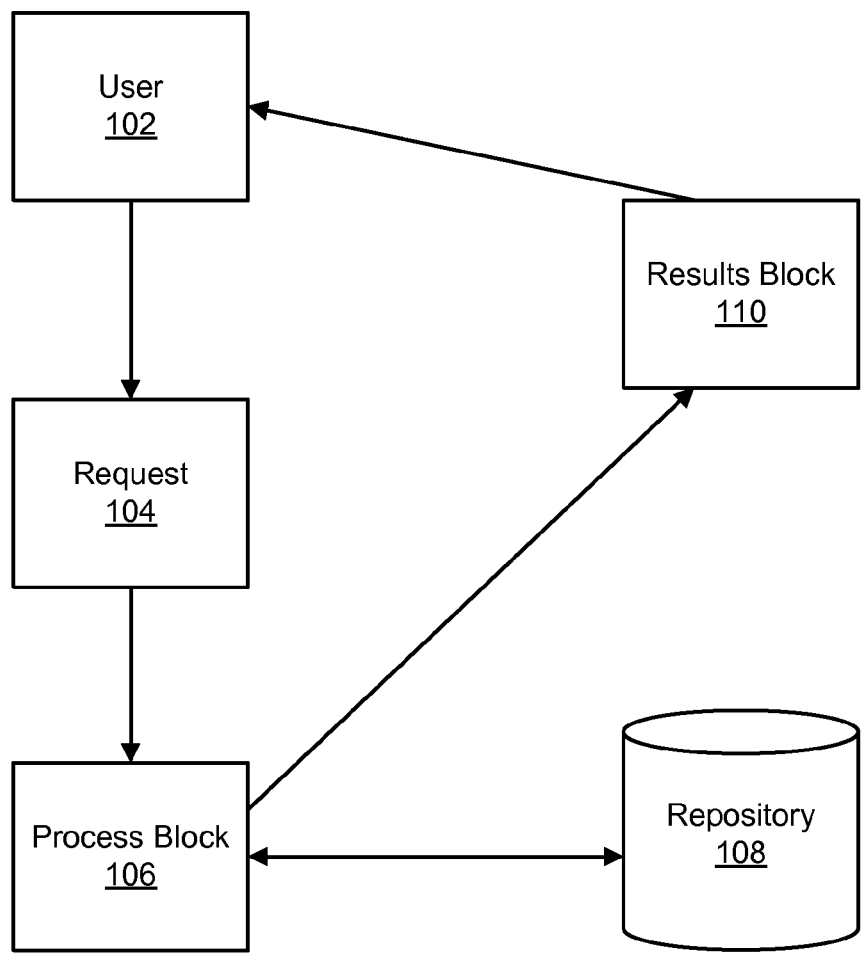
FIG. 1 depicts a schematic of creating a set of identifiers used in prior art.

Counterfeiters may attempt to generate identifiers for counterfeit objects. In order to make it difficult for counterfeiters to anticipate identifiers, identifiers should be randomized. Though randomization is useful, the identifiers should have values that are not too far away from each other. In many cases, for example, such as manufacturing or assembly lines, it is efficient to use the available identifier space to generate identifiers for a variety of objects Embodiments of the invention are directed to a method, a system and a computer program product for creating a set of identifiers. FIG. 1 shows a conventional schematic of creating a set of identifiers as disclosed in prior art. FIG. 1 shows a user 102 transmitting a request 104 to a process block 106, which depicts a process of generating identifiers. The request 104 also includes a required number of identifiers to be generated. A process block 106 recursively communicates with a repository 108 to generate a new set of identifiers.

Upon generating the new set of identifiers, the process block 106 is configured to transmit the new set of identifiers to a results block 110. The results block 110 communicates the new set of identifiers to a user 102. The repository 108 is configured to store pre-committed identifiers. The pre-committed identifiers are unavailable for further use as identifiers.

The recursive communication continues until the required number of identifiers is finally obtained. Conventionally, the process block 106 may use a process that uses a technique to generate random numbers. In one embodiment, the repository 108 may be structured data, for example, a relational database. In another embodiment, repository 108 may be an unstructured data for example, a file system.

Figure 2:
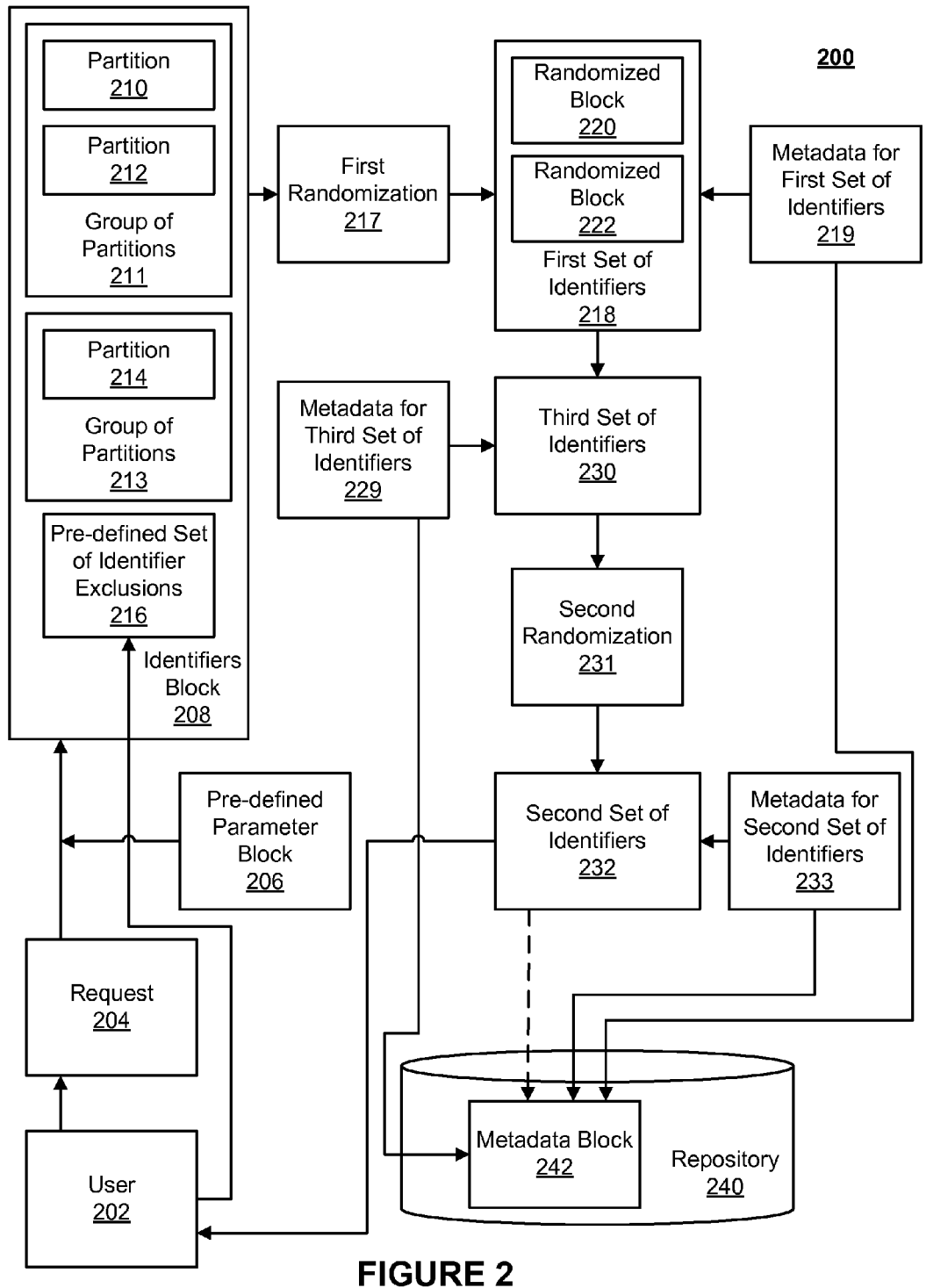
FIG. 2 shows a schematic of creating a set of identifiers.

FIG. 2 shows a schematic 200 of creating a set of identifiers. A user 202 is depicted transmitting a request 204 to a pre-defined range of identifiers block 208. The request 204 includes a pre-defined number of identifiers Q. In an exemplary embodiment that is described herein to illustrate one embodiment of the invention, the pre-defined number of identifiers Q is 4.

FIG. 2 further depicts a pre-defined parameter block 206, a first randomization 217, and a second randomization 231. The pre-defined parameter block 206 may include parameters such as, for example, a randomization factor RF. In an exemplary embodiment, the randomization factor RF is 5. FIG. 2 also shows a plurality of set of identifiers and their associated metadata. FIG. 2 depicts a first set of identifiers 218, metadata associated with the first set of identifiers 219, a second set of identifiers 232, metadata associated with the second set of identifiers 233, a third set of identifiers 230, and metadata associated with the third set of identifiers 229. FIG. 2 also depicts a repository 240 and a stored metadata block 242. The repository 240 may include structured data elements and/or unstructured data elements.

A total number of identifiers may be calculated as a product of the pre-defined number of identifiers Q and the randomization factor RF, Q*RF. In an exemplary embodiment, using the pre-defined number of identifiers Q as 4 and a randomization factor of 5, a total number of identifiers required is 20 (5*4). A first randomization 217 generates a first set of identifiers 218. In one embodiment, the first randomization generates a plurality of random values from a first seed. The values may be organized as the first set of identifiers 218.

FIG. 2 further depicts a plurality of groups of partitions 211, 213 of identifiers. The first set of identifiers 218 may be organized from a group of partitions 211, 213. Metadata associated with the first set of identifiers 219 may include corresponding information such as, for example, a randomization technique used to generate the first set of identifiers 218, the first seed number and a range.

In an exemplary embodiment, a pre-defined range of identifiers block 208 includes a range of 1 through 100 and includes a group of partitions 211 and another group of partitions 213. The group of partitions 213 includes only one partition 214. The group of partitions 211, in an exemplary embodiment, includes a range of numbers 1 thorough 20 and further includes two exemplary partitions: partition 210, and partition 212.

In an exemplary embodiment, if a total number of identifiers required is 20 and a size of a partition is 10, two partitions may be needed. Partition 210, in an exemplary mode includes sequential numbers 1 through 10 and partition 212 includes sequential numbers 11 through 20. The pre-defined range of identifiers block 208 also includes a pre-defined set of identifier exclusions 216. The pre-defined set of identifier exclusions 216 may be provided by the user 202, generated by an algorithm, or comprise previously used identifiers.

The first set of identifiers 218 includes, in an exemplary embodiment, two randomized blocks: a randomized block 220 corresponding to partition 210 and a randomized block 222 corresponding to partition 212. In an exemplary embodiment, the first randomization 217 produces randomized block 220 including a sequence (2, 4, 9, 10, 6, 5, 3, 1, 8, 7) and randomized block 222 including a sequence (20, 17, 11, 12, 15, 13, 14, 18, 16, 19).

The first set of identifiers 218 and the pre-defined set of identifier exclusions 216 are used to generate a third set of identifiers 230. In one embodiment, a subset of the pre-defined set of identifier exclusions 216 are removed from the first set of identifiers 218. Common elements from the pre-defined set of identifier exclusions 216 and each of randomization block 220 and randomization block 222 may be identified and deleted. The pre-defined number of identifiers Q may be selected from the remaining identifiers in the first set of identifiers to form the third set of identifiers 230. The first set of identifiers 218 may also be modified to generate the third set of identifiers 230. For example, the identifiers of the first set of identifiers 218 may be transformed using a third seed number. Metadata associated with the third set of identifiers 229 may include corresponding information, such as for example, a randomization technique used to generate the third set of identifiers 230, the third seed number, and a range.

In one exemplary embodiment, the pre-defined set of identifier exclusions 216 includes a set of two numbers 4 and 97. In one embodiment, common elements from pre-defined set of identifier exclusions 216 and each of randomization block 220 and randomization block 222 are identified. For randomization block 220 and pre-defined set of identifier exclusions 216, common element is 4. In one embodiment, the common element is eliminated from the randomization block 220 and a new sequence of (2, 9, 10, 6, 5, 3, 1, 8, 7) is created for randomization block 220.

In one embodiment, the pre-defined number of identifiers Q is selected from the first set of identifiers 218. Identifiers comprising the pre-defined number of identifiers may be selected from each randomization block 220, 222. In a certain embodiment, an equal number of identifiers may be selected from each randomization block 220, 222. The number of identifiers selected from each randomization block 220, 222 may be calculated as Q/N, where N is the number of randomization blocks 220, 222.

In one exemplary embodiment, the two randomization blocks 220, 222 are used and the pre-defined number of identifiers Q is 4, so 4/2 or 2 identifiers are selected from each randomization block 220, 222. In a certain embodiment, the first identifiers from each randomization block 220, 222 are used. Alternatively, identifiers may be selected at random from the randomization blocks 220, 222.

In the exemplary embodiment, the first two identifiers (2, 9) in the new sequence of randomization block 220 and first two (20, 17) from the sequence of randomization block 222 are selected, generating a combined third set of identifiers 230 with a sequence (2, 9, 20, 17). In subsequent cycles of generating identifiers, the identifiers (2, 9, 20, 17) may be added to the pre-defined set of identifier exclusions 216 and used to exclude identifiers.

A second randomization 231 is performed on the third set of identifiers 230 to generate a second set of identifiers 232. The second randomization 231 may be a reordering of the third set of identifiers 230. Alternatively, the second randomization 231 may be a transformation of the third set of identifiers 230 using a second seed number. In an exemplary embodiment, the second set of identifiers 232 has a sequence (9, 17, 2, 20).

Metadata associated with the second set of identifiers 233 may include corresponding information, for example, a randomization technique used, a second seed number, and a range. The second set of identifiers 232 is transmitted to the user 202. In one embodiment, the second set of identifiers 232 is transmitted to the repository 240. In another embodiment, only a metadata block 242 is stored in the repository 240. The metadata block 242 may store some or all information from a set of metadata associated with the first set of identifiers 218, a set of metadata associated with the second set of identifiers 233, and a set of metadata associated with the third set of identifiers 229.

In one embodiment, the second set of identifiers is incorporated in the pre-defined number of identifiers 216 and used to exclude identifiers from subsequent first sets of identifiers 218. Alternatively, the metadata block 242 may be used to generate the pre-defined number of identifiers 216 so that previously generated identifiers are excluded from subsequent first sets of identifiers 218.

In one embodiment, the first randomization 217 and the second randomization 231 may use the same randomization technique. In an embodiment of the invention, the first randomization 217 may use a randomization technique that produces a reproducible set of identifiers in response to the same metadata. In another embodiment of the invention, the second randomization 231 may use a randomization technique that produces a reproducible set of identifiers in response to the same metadata.

Figure 3:
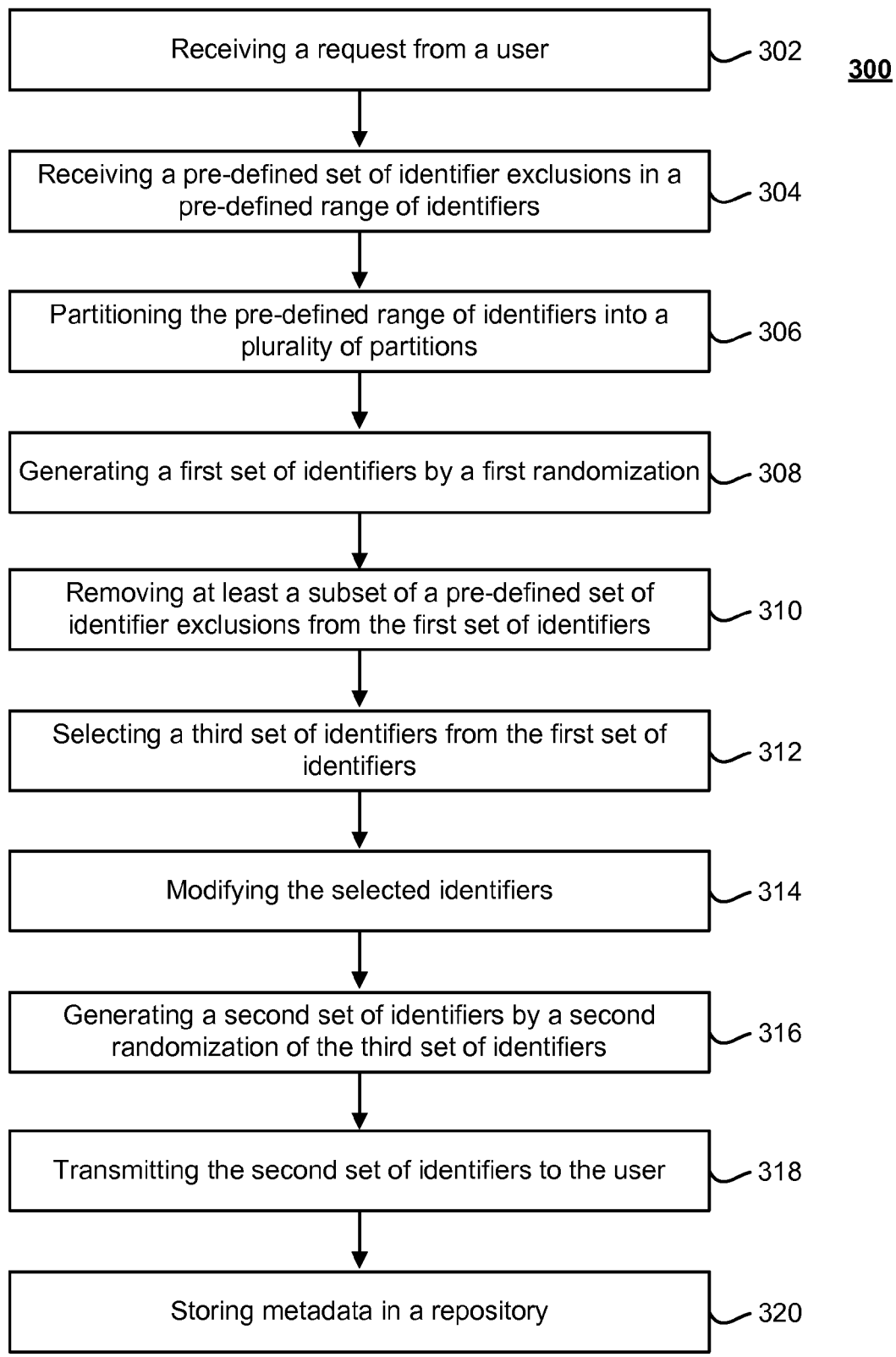
FIG. 3 shows a flow chart of a method for creating a set of identifiers.

FIG. 3 shows a flow chart of a method 300 for creating a set of identifiers. The description of the method 300 refers to elements of FIG. 2, like numbers referring to like elements. Step 302 depicts receiving the request 204 from the user 202 for creating the pre-defined number of identifiers Q in the pre-defined range of identifiers. The pre-defined range of identifiers may be embodied in the predefined range of identifiers block 208.

Step 304 depicts receiving a pre-defined set of identifier exclusions 216 in the pre-defined range of identifiers. The pre-defined set of identifier exclusions 216 may be generated from the metadata block 242. In one embodiment, the pre-defined set of identifier exclusions 216 may be received from the user 202. In another embodiment the pre-defined set of identifier exclusions 216 may be generated a computer program, an application, or the like.

Step 306 shows partitioning the pre-defined range of identifiers using a set of pre-defined parameters specifying a start and an end of each partition of the plurality of partitions 211, 213. The set of pre-defined parameters may in one embodiment include a partition randomization factor. The partition randomization factor may randomly specify a start and an end for each partition 211, 213.

Step 308 depicts generating a first set of identifiers 218 by a first randomization 217 of at least a group of partitions 211, 213 of a plurality of partitions. The first set of identifiers 218 may be generated by populating the partitions 211, 213 with identifier values generated using a randomization process and a first seed. The first set of identifiers 218 may be stored in one or more randomization blocks 220, 222.

Step 310 shows removing at least a subset of the pre-defined set of identifier exclusions 216 from the first set of identifiers 218. In one embodiment, a subset of the pre-defined set of identifier exclusions 216 is removed from the randomization blocks 220, 222 of the first set of identifiers 218.

Step 312 depicts selecting identifiers from the first set of identifiers 218. In one embodiment, the pre-defined number of identifiers Q is selected from the first set of identifiers 218. The selected identifiers may form the third set of identifiers 230. Step 314 depicts modifying the selected identifiers. In one embodiment, the selected identifiers are transformed using the third seed to generate the third set of identifiers 230.

Step 316 shows generating a second set of identifiers 232 by a second randomization 231 of the third set of identifiers 230. The second randomization 231 may transform the third set of identifiers 230 with the second seed to generate the second set of identifiers 232.

Step 318 depicts transmitting the second set of identifiers 232 to the user 202. In one embodiment the second set of identifiers 232 may be modified by associated pre-defined tags identifying the second set of identifiers 232 and then transmitting as a modified second set of identifiers. Step 320 shows storing, in the repository 240, at least one set of metadata selected metadata associated with the first set of identifiers 219, metadata associated with the third set of identifiers 229, and metadata associated with the second set of identifiers 233. The repository 240 is at least one of a structured data element or an unstructured data element.

Figure 4:
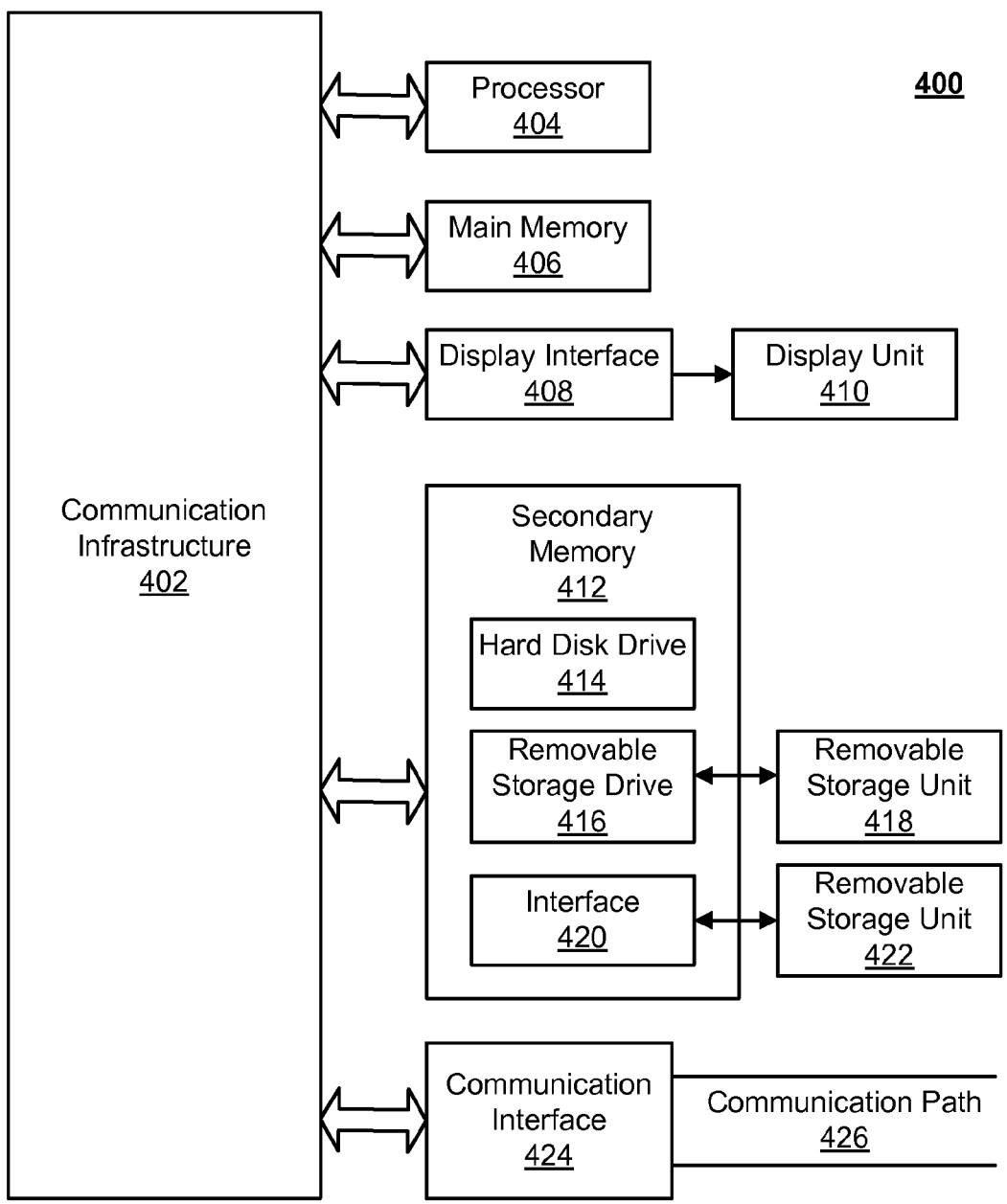
FIG. 4 shows an exemplary schematic of a computer system used for creating a set of identifiers as disclosed in FIGS. 2 and 3.

FIG. 4 shows a detailed schematic of a computer system 400 used for creating a set of identifiers. The exemplary computer system 400 can be used for implementing various embodiments of the invention. The description of the computer system 400 refers to elements of FIGS. 2-3, like numbers referring to like elements. In some embodiments, the computer system 400 can be used as a system executing process of the schematic 200 of FIG. 2, and can also be used to perform the method 300 described in FIG. 3.

The computer system 400 includes at least a processor 404. It should be understood that although FIG. 4 illustrates a single processor 404, one skilled in the art would appreciate that more than one processor 404 can be included as needed. The processor 404 is connected to a communication infrastructure 402, such as for example, a communications bus, cross-over bar, or network, where the communication infrastructure 404 is configured to facilitate communication between various elements of the exemplary computer system 400. Various software embodiments are described in terms of this exemplary computer system 400. After reading this description, it will become apparent to a person of ordinary skill in the relevant art(s) how to implement the invention using other computer systems and/or computer architectures.

The exemplary computer system 400 can include a display interface 408 configured to forward graphics, text, and other data from the communication infrastructure 402 (or from a frame buffer not shown) for display on a display unit 410. The computer system 400 also includes a main memory 406, which can be random access memory (RAM), and may also include a secondary memory 412. The secondary memory 412 may include, for example, a hard disk drive 414 and/or a removable storage drive 416, representing a floppy disk drive, a magnetic tape drive, an optical disk drive, etc. The removable storage drive 416 reads from and/or writes to a removable storage unit 418 in a manner well known to those having ordinary skill in the art. The removable storage unit 418, represents, for example, a floppy disk, magnetic tape, optical disk, etc. which is read by and written to by the removable storage drive 416. As will be appreciated, the removable storage unit 418 includes a computer usable storage medium having stored therein computer software and/or data.

In exemplary embodiments, the secondary memory 412 may include other similar means for allowing computer readable programs or other instructions to be loaded into the computer system. Such means may include, for example, a removable storage unit 422 and an interface 420. Examples of such may include a program cartridge and cartridge interface (such as that found in video game devices), a removable memory chip, such as a Programmable Read Only Memory (PROM) or an Erasable PROM (EPROM), and associated socket, and other removable storage units 422 and interfaces 420 which allow software and data to be transferred from the removable storage unit 422 to the computer system 400.

The computer system 400 may also include a communications interface 424. The communications interface 424 allows software and data to be transferred between the computer system and external devices. Examples of the communications interface 424 may include a modem, a network interface (such as an Ethernet card), a communications port, a Personal Computer Memory Card International Association (PCM-CIA) slot and card, and the like. Software and data transferred via the communications interface 424 are in the form of signals which may be, for example, electronic, electromagnetic, optical, or other signals capable of being received by communications interface 424. These signals are provided to the communications interface 424 via a communications path or channel 426. The channel 426 carries signals and may be implemented using wire or cable, fiber optics, a phone line, a cellular phone link, an RF link, and/or other communications channels.

In this document, the terms "computer program medium," "computer usable medium," and "computer readable medium" are used to generally refer to media such as the main memory 406 and the secondary memory 412, the removable storage drive 416, a hard disk installed in the hard disk drive 414, and signals. Computer program products are means for providing software to the computer system 500. The computer system 400 reads data, instructions, messages or message packets, and other computer readable information from the computer readable medium. The computer readable medium may be a tangible, non-transitory computer readable storage medium storing a computer readable program. Alternatively the computer readable medium may be a computer readable signal medium transmitting the computer readable program.

The computer readable storage medium may be non-volatile memory, such as Floppy, Read Only Memory (ROM), Flash memory, Disk drive memory, Compact Disk ROM (CD-ROM), and other permanent storage. The computer readable storage medium may also be volatile memory such as RAM, Dynamic RAM (DRAM), and Static RAM (SRAM).

The computer readable signal medium can be used, for example, to transport information, such as data and computer instructions, between computer systems. Furthermore, the computer readable signal medium may comprise computer readable information in a transitory state medium such as a network link and/or a network interface, including a wired network or a wireless network that allows a computer to read such computer readable information.

Computer readable programs (also referred to herein as computer control logic and computer programs) are stored in the main memory 406 and/or the secondary memory 412. Computer readable programs may also be received via the communications interface 424. Such computer readable programs, when executed, can enable the computer system 400 to perform the features of exemplary embodiments of the embodiments as discussed herein. In particular, the computer readable programs, when executed, enable the processor 404 to perform the features of the computer system 400. Accordingly, such computer readable programs represent controllers of the computer system 400.

Embodiments also provide a system for creating a set of identifiers, the system including at least one processor 404 and at least one computer readable storage medium such as the memory 406. Embodiments further provide a computer program product for creating a set of identifiers, the computer program product including a computer readable storage medium storing a computer readable program executed by the processor 404 to carry out a method of creating a set of identifiers as described in the various embodiments set forth above and described in detail.

Advantages of various embodiments of the invention include, among others, improved performance and less response time for generating identifiers. Advantages of various embodiments of the invention also include reduced storage needed for allocating identifiers and efficient retrieval of identifiers. Advantages of various embodiments of the invention further include excluding a set of pre-defined exclusions and optimal use of an available range of identifiers in a sparse identifier space. Although various advantages of the specific embodiments of the invention are described, those skilled in the art will appreciate from the teaching of the disclosure that the advantages of the invention are not limited to the above mentioned.

The described techniques may be implemented as a method, apparatus or article of manufacture involving software, firmware, micro-code, and hardware such as logic, memory and/or any combination thereof. The term "article of manufacture" as used herein refers to a computer readable program or logic and memory implemented in a medium, where such medium may include hardware logic and memory, such as an integrated circuit chip, Programmable Gate Array (PGA), Application Specific Integrated Circuit (ASIC), or a computer readable medium, such as magnetic storage medium (e.g., hard disk drives, floppy disks, tape, etc.), optical storage (CD-ROMs, optical disks, etc.), volatile and non-volatile memory devices, such as EEPROM, ROM, PROM, RAM, DRAM, SRAM, flash, firmware, programmable logic, and the like.

A computer readable program from the computer readable medium is accessed and executed by the processor 404. The computer readable medium in which the computer readable program is encoded may also include transmission signals propagating through space or a transmission media, such as an optical fiber, copper wire, etc. The transmission signal in which the code or logic is encoded may further include a wireless signal, satellite transmission, radio waves, infrared signals, Bluetooth, the internet etc. The transmission signal in which the code or logic is encoded is capable of being transmitted by a transmitting station and received by a receiving station, where the code or logic encoded in the transmission signal may be decoded and stored in hardware or a computer readable medium at the receiving and transmitting stations or devices. Additionally, the "article of manufacture" may include a combination of hardware and software components in which the code is embodied, processed, and executed. Of course, those skilled in the art will recognize that many modifications may be made without departing from the scope of embodiments, and that the article of manufacture may include any information bearing medium. For example, the article of manufacture includes a storage medium having stored therein instructions that when executed by a machine results in operations being performed.

Certain embodiments can take the form of an entirely hardware embodiment, an entirely software embodiment or an embodiment containing both hardware and software elements. In one embodiment, the invention is implemented in software, which includes but is not limited to firmware, resident software, microcode, etc.

Elements that are in communication with each other need not be in continuous communication with each other, unless expressly specified otherwise. In addition, elements that are in communication with each other may communicate directly or indirectly through one or more intermediaries. Additionally, a description of an embodiment with several components in communication with each other does not imply that all such components are required. On the contrary a variety of optional components are described to illustrate the wide variety of possible embodiments.

Further, although process steps, method steps or the like may be described in a sequential order, such processes, methods and algorithms may be configured to work in alternate orders. In other words, any sequence or order of steps that may be described does not necessarily indicate a requirement that the steps be performed in that order. The steps of processes described herein may be performed in any order practical. Further, some steps may be performed simultaneously, in parallel, or concurrently. Further, some or all steps may be performed in run-time mode.

The terms "certain embodiments", "an embodiment", "embodiment", "embodiments", "the embodiment", "the embodiments", "one or more embodiments", "some embodiments", and "one embodiment" mean one or more (but not all) embodiments unless expressly specified otherwise. The terms "including", "comprising", "having" and variations thereof mean "including but not limited to", unless expressly specified otherwise. The enumerated listing of items does not imply that any or all of the items are mutually exclusive, unless expressly specified otherwise. The terms "a", "an" and "the" mean "one or more", unless expressly specified otherwise.

A computer readable program or computer program in the present context means any expression, in any language, code or notation, of a set of instructions intended to cause a system having an information processing capability to perform a particular function either directly or after either or both of the following a) conversion to another language, code or notation; b) reproduction in a different material form.

Although exemplary embodiments of the invention have been described in detail, it should be understood that various changes, substitutions and alternations could be made thereto without departing from spirit and scope of the inventions as defined by the appended claims. Variations described for exemplary embodiments can be realized in any combination desirable for each particular application. Thus particular limitations, and/or embodiment enhancements described herein, which may have particular advantages to a particular application, need not be used for all applications. Also, not all limitations need be implemented in methods, systems, and/or apparatuses including one or more concepts described with relation to exemplary embodiments of the invention.

What is claimed is:

1. A method implemented on a computing device for creating a set of identifiers, the method comprising:
   generating, by the computing device, a first set of identifiers, comprising:
      generating a block of values within a pre-defined range of values for use as identifiers;
      partitioning values of the block into partitions, wherein each partition has a unique range of values within the pre-defined range of values; and
      performing a first randomization comprising reordering values of a first one of the partitions in a random order and reordering values of a second one of the partitions in a random order;
   selecting, by the computing device, a third set of identifiers from the random ordered values of the first and second partitions, comprising:
      receiving a pre-defined set of identifier exclusions in the pre-defined range of identifiers;
      removing at least a subset of the pre-defined set of identifier exclusions from the first set of identifiers; and
      selecting values of the first partition and values of the second partition for the third set of identifiers;
   generating a second set of identifiers by at least performing a second randomization on the third set of identifiers; and
   transmitting the second set of identifiers to a user.

2. The method of claim 1, further comprising:
   receiving a request from a user for creating a pre-defined number of identifiers in the pre-defined range of identifiers.

3. The method of claim 1, further comprising:
   partitioning the pre-defined range of identifiers into partitions using a set of pre-defined parameters.

4. The method of claim 3, further comprising:
   storing at least one selected from a set of:
      metadata associated with the first set of identifiers,
      metadata associated with the third set of identifiers, and
      metadata associated with the second set of identifiers, in a repository.

5. The method of claim 4, wherein the repository is at least one of a structured data element or an unstructured data element.

6. A system for creating a set of identifiers, the system comprising:
   a non-transitory computer readable storage medium storing a computer readable program;
   a processor executing the computer readable program, the computer readable program:
      generating a first set of identifiers, including:
         generating a block of values within a pre-defined range of values for use as identifiers;
         partitioning values of the block into partitions, wherein each partition has a unique range of values within the pre-defined range of values; and
         performing a first randomization comprising reordering values of a first one of the partitions in a random order and reordering values of a second one of the partitions in a random order;
      selecting a third set of identifiers from the random ordered values of the first and second partitions, comprising:
         receiving a pre-defined set of identifier exclusions in the pre-defined range of identifiers;
         removing at least a subset of the pre-defined set of identifier exclusions from the first set of identifiers; and
         selecting values of the first partition and values of the second partition for the third set of identifiers;
      generating a second set of identifiers by at least performing a second randomization on the third set of identifiers; and
      transmitting the second set of identifiers to a user.

7. The system of claim 6, the computer readable program further:
   receiving a request from a user for creating a pre-defined number of identifiers in the pre-defined range of identifiers.

8. The system of claim 6, the computer readable program further:
   partitioning the pre-defined range of identifiers into partitions using a set of pre-defined parameters.

9. The system of claim 8, the computer readable program further storing at least one selected from a set of:
   metadata associated with the first set of identifiers,
   metadata associated with the third set of identifiers, and
   metadata associated with the second set of identifiers, in a repository.

10. The system of claim 9, wherein the repository is at least one of a structured data element and an unstructured data element.

11. A computer program product for creating a set of identifiers, the computer program product comprising a non-transitory computer readable storage medium storing computer readable program code executed by a processor to:
  generate a first set of identifiers including:
    generating a block of values within a pre-defined range of values for use as identifiers;
    partitioning values of the block into partitions, wherein each partition has a unique range of values within the pre-defined range of values; and
    performing a first randomization, comprising reordering values of a first one of the partitions in a random order and reordering values of a second one of the partitions in a random order; and
  select a third set of identifiers from the random ordered values of the first and second partitions, comprising:
    receiving a pre-defined set of identifier exclusions in the pre-defined range of identifiers;
    removing at least a subset of the pre-defined set of identifier exclusions from the first set of identifiers; and
    selecting values of the first partition and values of the second partition for the third set of identifiers;
  generate a second set of identifiers by at least performing a second randomization on the third set of identifiers; and
  transmit the second set of identifiers to a user.

12. The computer program product of claim 11, further configured to:
  receive a request from a user for creating a pre-defined number of identifiers in the pre-defined range of identifiers.

13. The computer program product of claim 11, further configured to:
  partition the pre-defined range of identifiers into partitions using a set of pre-defined parameters.

14. The computer program product of claim 13, further configured to:
  store at least one selected from a set of:
    metadata associated with the first set of identifiers,
    metadata associated with the third set of identifiers, and
    metadata associated with the second set of identifiers,
  in a repository, wherein the repository is at least one of a structured data element or an unstructured data element.

* * * * *